United States Patent [19]

Wells

[11] 3,840,692

[45] Oct. 8, 1974

[54] COVER PLATE FOR ELECTRICAL OUTLETS, SWITCHES, AND THE LIKE

[76] Inventor: Robert B. Wells, R.R. No. 1, Box 140BB, Middlebourne, W. Va. 26149

[22] Filed: Apr. 17, 1973

[21] Appl. No.: 352,057

[52] U.S. Cl................................ 174/66, 220/24.2
[51] Int. Cl............................................. H02g 3/14
[58] Field of Search...... 174/66, 67; 220/24.2, 24.3; 339/123

[56] References Cited
UNITED STATES PATENTS

| | | | |
|---|---|---|---|
| 1,493,003 | 5/1924 | Recker et al. | 339/123 |
| 1,784,277 | 12/1930 | Darlington | 174/66 UX |
| 2,289,198 | 7/1942 | Jordan | 220/24.2 |

Primary Examiner—J. V. Truhe
Assistant Examiner—David A. Tone

[57] ABSTRACT

A cover plate for completely covering a conventional type plate secured to an electrical outlet, switch, and the like which is mounted in an electrical box type receptacle secured in a wall opening, the cover plate consisting of a rectangularly shaped approximately flat plate member slightly larger than the wall plate and having a rearwardly extending peripheral type flange completely about its edge surfaces along with mounting openings adapted to be in alignment with mounting openings in the wall plate when the cover plate is placed thereover and secured thereto by the same screw type fastening means utilized to secure the wall plate to the electrical device, the cover plate adapted for mounting over the wall plate in a manner to completely cover the entire wall plate. The cover plate adapted for use in covering a wall plate of the standard switch plate type including an aperture therein aligned with the aperture of the switch plate accommodating the forwardly projecting portion of the electrical switch device to permit operation thereof through the cover plate. The cover plate for use with a standard type outlet plate including slots extending therethrough of a length and thickness approximately equal to those of the slots in the body portions of the outlet device and adapted for alignment therewith upon mounting the cover plate over the outlet plate in a manner completely covering the outlet plate and body portions of the outlet while permitting the blades of an electrical plug to be inserted therethrough and received in the slots of the electrical outlet for energization thereby.

1 Claim, 6 Drawing Figures

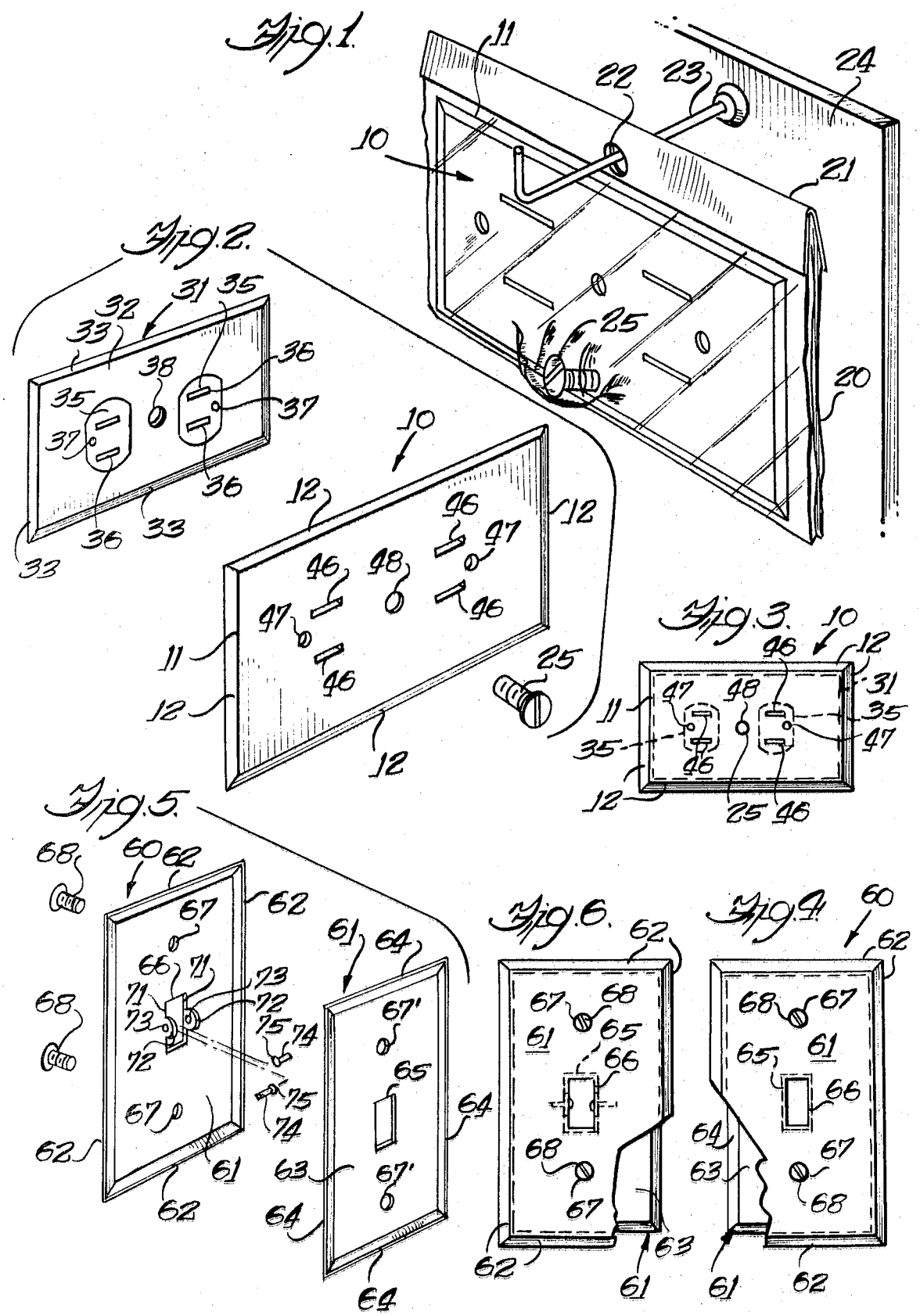

COVER PLATE FOR ELECTRICAL OUTLETS, SWITCHES, AND THE LIKE

BACKGROUND OF THE INVENTION

1. Field of the Invention

This invention relates generally to decorative devices and more particularly to cover plates for use with wall plates secured to electrical wiring devices mounted in electrical box type receptacles secured in a wall opening, such devices consisting of electrical outlets, switches, and the like.

2. Description of the Prior Art

At the present time it is considered customary and standard to mount wiring devices, such as electrical outlets, switches, and the like in electrical box type receptacles by afixing mounting straps forming part of the wiring device to projections on the electrical box and to then cover the working parts of the wiring device and the entire exposed open front area of the electrical box in the surrounding wall opening with a wall plate. This wall plate is generally held in position on the electrical device by one or more screws which pass through the wall plate and are threaded into the apertures in the electrical device.

The electrical industry has standardized the shape and form of electrical outlets and electrical switches along with the sizes of the wall plates to be utilized therewith, with the switches and outlets being utilized extensively in homes, businesses, and manufacturing establishments throughout the country. However, such switches and outlets are generally only available in either white or brown colors, with the wall plate also generally only being available in white or brown colors, this making both the wall plate and electrical devices unpleasingly noticeable when mounted on the walls of a room unless the walls are similarly colored white or brown.

In this day and age of a great variety of individual preferences, it is very unusual when a white or brown colored room is found which matches the particular white or brown wall plate and electrical device, this therefore dictating that the wall plate and electrical device must be painted after installation to match the surrounding wall colors, this being a great inconvenience as well as requiring the utilization of services other than an electrician whenever an electrical device or wall plate is installed or changed since the electrical installer does not have the skills or time required to paint the wallplate and electrical device to blend with the color of the walls.

It is acknowledged that there are available wallplates of different designs and colors to either blend with the color of the wall or to form a decorative item on the wall, but all such available devices suffer from the same difficulty as they are intended to replace the standard type wall plate with the body portions of the electrical device, such as electrical outlets, projecting therethrough or therefrom in the same manner as a standard wall type outlet plate such that the white or brown colored electrical outlet device is still readily seen so that even though the wall plate may blend with or be decorative on the wall, the color of the outlet device still detracts therefrom in an unpleasing manner.

Further, prior art devices that replaced the standard wall plates all suffer from a further common problem in that upon removal of the standard wall plate from the wall the danger of electrical shock to an individual unskilled in handling and installing electrical devices provides a dangerous hazard as the electrical working parts of the electrical devices are exposed for possible contact with the possibility of contact therewith by an unskilled individual installing the decorative plate, such as the normal homeowner, housewife, and the like, resulting in a very dangerous and possibly deadly situation.

SUMMARY OF THE INVENTION

The present invention remedies and overcomes all of the foregoing deficiencies and disadvantages of presently available wall plates by providing a novel cover plate adapted for mounting over the wall plate in a manner to completely cover the same, the cover plates being supplied in a variety of colors and sizes to blend with or complement a wide variety of wall colors.

Further, the present invention provides a novel cover plate for completely covering an outlet plate and outlet devices thereon while permitting the insertion of the blades of an electrical plug therethrough for engagement with the electrical working parts of the outlet device.

Still further, the present invention provides a cover plate adapted for mounting over a standard wall plate without the requirement of any special tools or knowledge and without the need of any special skills as the wall plate remains in position during the mounting procedure such that the electrical working parts of the electrical device are not exposed for contact by the individual doing the installation of the cover plate.

Yet a further feature of the present invention is the provision of a cover plate adapted for afixing directly over a wall plate in a quick and easy manner, the cover plate being slightly larger than the wall plate so as to completely cover the same with the cover plate being held on the wall plate by the same screws and fastening means securing the wall plate to the electrical wiring device.

The provision of a cover plate for wall plates of electrical wiring devices, such as briefly outlined above, and possessing the stated advantages, constitutes the principle features of the present invention. The provision of a cover plate which is simple in its construction and which therefore may be readily manufactured at a low cost and by simple manufacturing methods; one which is rugged and durable and which therefore may be guaranteed by the manufacturer to withstand rough usage; one which is aesthetically pleasing and refined in appearance; one which may, in its entirety, may be manufactured and marketed as a component for use with complementary standard wall plates and the like for installation by the initial installer, or which may be marketed and sold as accessory items for later installation to decoratively cover wall plates in a manner to blend with the surrounding wall surfaces; and one which, otherwise, is well adapted to perform the services required of it, are further desirable features which have been borne in mind in the production and the development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a preferred form of a cover plate in accord with the principles of the present invention intended for use in covering an outlet type wallplate;

FIG. 2 is an exploded perspective view illustrating the preferred method of mounting the cover plate of FIG. 1 over a standard type outlet plate;

FIG. 3 is a front elevational view of the cover plate of FIG. 2 mounted to the outlet plate;

FIG. 4 is a perspective view illustrating a preferred embodiment of a cover plate adapted for use with a switch plate;

FIG. 5 is a further embodiment of a preferred form of a cover plate adapted for utilization in covering a wall mounted switch plate; and FIG. 6 is a front elevational view, partially broken away, illustrating a cover plate and wall plate of FIG. 5 as assembled together.

DESCRIPTION OF THE PREFERRED EMBODIMENTS

With reference to the drawings as hereinafter set forth in greater detail, it is to be understood that for purposes of convenience the cover plate has been illustrated as associated with two different electrical devices, these two devices being a switch and a dual type electrical outlet of the standard grounded type, but it is to be understood that this is merely illustrative as numerous other electrical devices are envisioned within the scope of the invention, such as pilot lights, single receptacles, and the like wherein the cover plate may be utilized in the same manner as will be described herein below.

Referring now to the drawings in detail and in particular to FIGS. 1 to 3 inclusive, a preferred form of a cover plate embodying the invention is designated in its entirety by the reference numeral 10 and is comprised of a substantially flat body member 11 having beveled rearwardly extending flangelike edge portions 12 completely surrounding the peripheral edges and formed integral with the body member. The cover plate 10 is manufactured out of metal, wood, plastic, or any other suitable satisfactory material to provide an aesthetically pleasing and refined appearance. The cover plate is envisioned as being provided in a variety of sizes and colors for utilization as wall plates of a great variety of sizes and for blending and complementing wall surfaces of a great variety of colors. A preferred example would be the manufacturing of the cover plate 10 in a high impact plastic, such as bakelite by an injection molding process which would permit fabrication in a great variety of integrally formed colors to coordinate with the decor of any room where the electrical devices and wall plates may be found.

Referring to FIG. 1, there is illustrated a cover plate 10 packaged for display and marketing purposes. The package may comprise a cellophane or plastic see-through bag 20 which is closed at the open end thereof by a folded-over cardboard or paper cover 21 having a mounting aperture 22 supplied therein adapted for receipt on a hook 23 projecting outwardly from a rack type display mounting surface 24 in order to display the cover plate to prospective purchasers in an aesthetically pleasing and eye catching manner. The cover 21 may be secured to the bag 20 by staples or other suitable fastening means, and if so desired, instructions as to the method of installation of the cover plate 10 may be packaged with the cover plate to facilitate the installation of the same. Further, it is noted that a mounting screw 25 is packaged with the cover plate 10, the mounting screw preferably being of the same color as the cover plate so as to pleasingly blend therewith upon installation of the cover plate.

Referring to FIG. 2, there is illustrated a standard type outlet plate 31 having a substantially flat body member 32 and outwardly beveled peripheral edge portions 33. The outlet 31 shown in position over a standard type outlet device consisting of two parallel spaced apart outlets 35 which are mounted to an electrical outlet box (not shown) in a conventional manner. Each outlet 35 includes a pair of parallel slots 36 and a grounding aperture 37, these being of the well known conventional structure for receiving therein the blades of a receptacle plug (not shown) for energization by the outlets. A mounting opening 38 is disposed intermediate the outlet 35 and is in axial alignment with a threaded aperture (not shown) in the outlet device for receiving mounting screw 25 therethrough for threading into the threaded aperture to retain the outlet plate 35 securely to the outlet.

The cover plate 10 is of a size slightly larger than the size of outlet plate 31 and is adapted for mounting thereover such that body member 11 is in juxtaposition with the face surface of the outlet plate with the edges 12 completely surrounding the edges 33 of the outlet plate and engaging with the wall surface adjacent thereto such that the cover plate completely covers the outlet plate and the outlet 35. The body member 11 is provided with a mounting opening 48 adapted to be in axial alignment with mounting opening 38 of the outlet plate 31 upon placing the cover plate thereover such that, as illustrated in FIG. 3, screw 25 passes through openings 48 and 38 and as threadedly received in the threaded aperture in the outlet device for securely retaining the cover plate over the outlet plate and secured to the outlet device. The body member 11 is provided with a plurality of parallel spaced apart slots 46 and openings 47 of the same approximate size as slots 36 and openings 37 of outlets 35 such that the slots 46 and openings 47 in the cover plate are in substantial alignment with the slots 36 and openings 37 in the outlet 35 upon mounting of the cover plate over the outlet plate 31 by mounting screw 25.

Referring to FIG. 3, it is seen that cover plate 10 completely covers outlet plate 31 and outlets 35 with access to outlet slots 36 and outlet openings 37 being provided through cover plates slots 46 and cover plate openings 47 for insertion of the blades of an electrical plug therethrough for engagement with the electrical working parts of the outlet for energization of an electrical item, such as a lamp, fixture, and the like therefrom.

Referring now to FIG. 4, there is illustrated a preferred emodiment of a cover plate, generally designated by reference number 60, for use with a switch plate generally designated by reference number 61. The cover plate 60 is similar to cover plate 10 except being designed for utilization with a switch plate 61 rather than with an outlet plate 31. Cover plate 60 includes a substantially flat body member 61 and peripheral rearwardly extending beveled edge portion 62 formed integrally herewith. Switch plate 61 is of the conventional type including a substantially flat body member 63 having bevelled edge peripheral portions 64 with a rectangular opening 65 disposed therein for accommodating therethrough the forwardly extending portion of an electrical switch device (not shown). The body member 61 of cover plate 60 is provided with a rectangular aperture 66 adapted for axial alignment with aperture 65 of switch plate 61 upon mounting of the cover plate 60 over the switch plate, aperture 66 being approximately the same length and width of aperture 65 for accommodating the forwardly extending portion of an electrical switch device therethrough. Cover plate 60 is provided with a pair of spaced apart mounting openings 67 adapted for alignment with similar mounting openings (not shown) provided in switch plate 61 with the cover plate being secured to the wall plate which, in turn, is secured to the electrical switch device by means of screws 68 passing through mounting openings 67 and through the switch plate to be threadedly received in threaded apertures provided in the switch device for securing the overall assembly thereto.

It is to be understood that, as described relative to cover plate 10, cover plate 60 is of a size slightly larger than switch plate 61 so as to completely cover the same when mounted thereover. Further, it is to be understood that aperture 66 in cover plate 60 may be of a length and width slightly less than the length and width of aperture 65 in switch plate 61 to assure that no portion of the body member 63 of the switch plate is visible through aperture 66.

Referring now to FIGS. 5 and 6 inclusive, there is disclosed a slightly modified form of cover plate 60 adapted for utilization with a switch plate 61. In this form of the invention, the switch plate 61 remains the same as does most of the aforedescribed cover plate 60, with the only difference residing in the addition of a further additional means of securing the cover plate to the switch plate. Due to the similarity between the two forms of the invention, and in order to avoid needless repetition of the description, similar reference numerals have been applied to the corresponding parts as between the disclosures of FIG. 4 and of FIGS. 5 and 6.

Aperture 66 is of a width and length slightly less than aperture 65 with the opposed longitudinal edges 71 of aperture 66 each having a rearwardly extending transversely aligned flange member 72 formed integrally therewith each flange member having an axially aligned opening 73 therethrough for receiving therein an associated pin member 74 having a head portion 75 formed integrally therewith.

In operation, cover plate 60 is placed over switch plate 61 with flange members 72 extending through switch aperture 65, after which pins 74 are inserted through openings 73 in opposed transverse directions with the head portions 75 of the pins engaging the interior face surface of the associated flange member with the projecting end of each pin projecting transversely outwardly from the flange member in a manner to engage with the rear surface of the body member 63 of the switch plate thereby securely holding apertures 66 and 65 tightly together to assure that no portion of the body member 63 of switch plate 61 is visible through aperture 66 of the cover plate 60. Mounting screws 68 are then passed through mounting holes 67 in cover plate 60 and aligned mounting holes 67' for securing the overall assembly to the electrical switching device in the same manner as aforedescribed.

It is to be understood that the form of this invention herewith shown and described is to be taken as preferred examples of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A cover plate adapted to completely cover a rectangularly shaped conventional type electrical switch wall plate secured by two screws to a conventional type electrical toggle switch wiring device mounted in an electrical box type receptacle secured in a wall opening, the switch having an operating member projecting forwardly therefrom, the wall plate having a rectangular aperture therein adapted for accomodating therethrough the forwardly projecting operating member of the switch, the switch plate including a pair of spaced apart mounting openings in alignment with similarly spaced apart and threaded openings provided in the switch for receiving therethrough the two mounting screws in a threaded manner for securing the switch plate to the switch device, the cover plate comprising:

a rectangularly shaped substantially flat cover member slightly larger than the wall plate to be covered thereby, the cover member having a face surface and a back surface, the back surface adapted to be placed in juxtaposition with the face surface of the wall plate in a manner completely covering the same;

a flange like member formed integrally with the cover member and disposed about the peripheral edges in a manner projecting outwardly of the back surface of the cover member and adapted to overlap all of the peripheral edges of the wall plate and engage with the adjacent wall surfaces about the wall opening to completely surround and enclose the wall plate;

a pair of spaced apart mounting holes extending through the cover member and disposed for alignment with the mounting openings in the switch plate for receiving the two mounting screws therein to secure the cover plate to the switch wall plate;

a rectangular aperture in the cover member of a slightly lesser width and length than the similarly provided rectangular aperture in the switch plate for accomodating the forwardly projecting operating member of the switch therethrough, the cover member aperture adapted for alignment with the switch plate aperture upon mounting of the cover member over the swich plate, the cover member aperture for accommodating the forward projecting operating member of the switch including substantially parallel spaced apart longitudinally extending side edges;

a pair of rearwardly extending flange members, each flange member associated with one of the cover member aperture side edges, and each flange member having a transversely extending opening provided therein; and a pair of pin members each removably inserted in one of the flange member openings and pointing in opposed transversely extending directions, one pin member being associated with each flange member, the flange members disposed for insertion through the switch wall plate aperture upon the placing of the cover plate over the switch wall plate in an overlapping manner with the flange members projecting rearwardly of the switch plate and with the pin members inserted through their respective flange member openings to engage with the rear surface of the switch plate in a manner encapturing opposed portions of the switch wall plate between the pin members and the cover plate thereby assisting in retaining the cover plate securely mounted in a tight manner to the switch plate.

* * * * *